Jan. 9, 1968     T. S. HANANIA     3,362,566
COVER FOR POTS AND THE LIKE
Filed Dec. 3, 1965
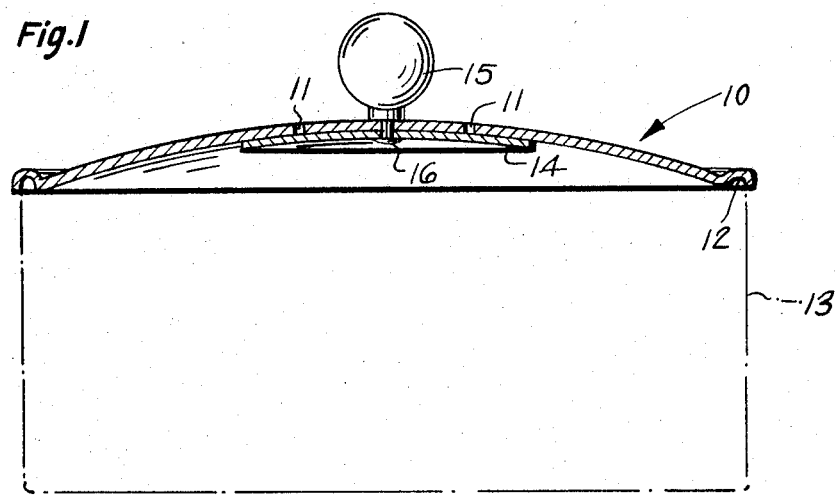
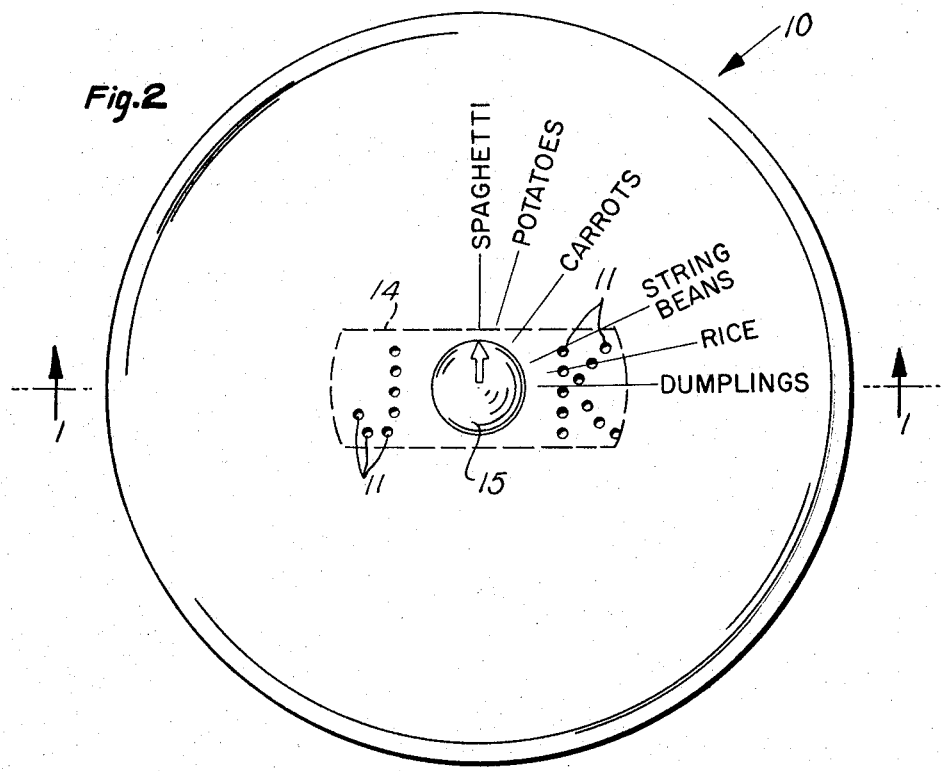
INVENTOR
*Tewfic S. Hanania*

3,362,566
COVER FOR POTS AND THE LIKE
Tewfic S. Hanania, 786 Colony Lane, 8th Ave. SW.,
Largo, Fla. 33540
Filed Dec. 3, 1965, Ser. No. 512,266
1 Claim. (Cl. 220—44)

ABSTRACT OF THE DISCLOSURE

A pot cover having perforations therethrough and a rotatable plate immediately therebelow operable by a knob disposed on the upper face of the cover so as to selectively block out or open certain of the perforated openings thereby controlling the amount of steam to be dissipated from a boiling pot.

This invention relates to covering devices, and more particularly to a cover for pots and the like.

It is therefore the main purpose of this invention to provide utensil cover to a variety of vessels which will serve to eliminate overflow of liquid which soils the cooking vessels and the range upon which they are used.

Another object of this invention is to provide utensil cover which will substantially reduce the danger of possible fire, particularly when the vessel is used on an electric range.

Still another object of this invention is to provide a utensil cover which will be novel and decorative as well as serving a useful function.

Other objects and advantages of this invention will become apparent from a consideration of the following detailed description taken in connection with the accompanying drawing wherein a satisfactory embodiment of the invention is not limited to the details disclosed but includes all such variations and modifications as fall within the spirit of the invention and the scope of the appended claims.

In the drawing:

FIGURE 1 is a cross-sectional view taken along the lines 1—1 of FIGURE 2 and viewed in the direction indicated by the arrows;

FIGURE 2 is a top plan view of the invention.

According to this invention, a utensil cover 10 is provided with a plurality of openings 11 thus allowing escape means for air.

It will be noted that the openings 11 may be spaced to form the initials of the owner thus personalizing cover 10. It shall further be noted that a plurality of openings 11 may extend throughout the entire area of cover 10 if desired.

Utensil cover 10 is provided with annular groove along its under side thus allowing cover 10 to remain stationary upon the top vessel 13. An elongated and arcuate plate 14 is positioned along the concave interior of cover 10 and is rotatably secured to knob 15 by means of rivet 16. Plate 14 serves as a valve when desired by grasping knob 15 and rotating plate so that it covers the opening 11 or uncovers openings 11.

Knob 15 may be rotated to partially uncover openings 11 when desired which will be required when cooking different types of food. Foods such as spaghetti need a greater amount of exposed opening than some other foods to prevent forming an overflow thus the knob 15 and its associated rotatable plate 14 serve to widen the scope of cover 10 and its usefulness.

It shall also be noted that markings (not shown) may be inscribed upon outer surface of utensil cover 10 and knob 15 may be inscribed with a single radial marking to adjust position of plate with a specto, names of food which may be inscribed alongside of the markings upon the cover thus allowing the user to quickly set proper degree of opening of said openings 11 for a particular type of food.

What I now claim is:

1. A utensil cover comprising a circular, concavo-convex metal plate, a correspondingly concavo-convex rectangular plate positioned immediately therebelow, said circular plate having a plurality of perforated openings therethrough, said rectangular plate being secured by a rivet extending through the center of said circular plate and being connected to a knob rotatable upon the upper side of said circular plate, said knob providing a means for rotating said rectangular plate, said rotatable rectangular plate selectively closing said perforated openings, said knob having an indicator arrow marked thereupon, the upper side of said circular plate having the names of various foods inscribed thereupon, the position of said food names being associated with said indicator arrow of said knob to provide instruction for the position of said rectangular plate for cooking each particular food.

References Cited

UNITED STATES PATENTS

| | | | |
|---|---|---|---|
| 905,879 | 12/1908 | Jacoby | 220—44 |
| 1,288,150 | 5/1917 | Wass | 220—44 |
| 1,328,001 | 1/1920 | Kinsman | 220—44 |
| 1,862,778 | 6/1932 | Vought | 220—44 |

THERON E. CONDON, *Primary Examiner.*

JAMES R. GARRETT, JOSEPH R. LECLAIR,
*Examiners.*